Fig. 1

Samuel C. Collins
INVENTOR.

BY [signature]
Attorney

Fig. 2

Samuel C. Collins
INVENTOR.

BY [signature]

Attorney

Dec. 10, 1968     S. C. COLLINS     3,415,077
METHOD AND APPARATUS FOR CONTINUOUSLY SUPPLYING
REFRIGERATION BELOW 4.2°K
Filed Jan. 31, 1967     6 Sheets-Sheet 3

Fig. 3

Samuel C. Collins
INVENTOR.

BY *Bessie A. Lepper*

Attorney

Fig. 4

Samuel C. Collins
INVENTOR.

Fig. 5

Samuel C. Collins
INVENTOR.

Dec. 10, 1968

S. C. COLLINS 3,415,077

METHOD AND APPARATUS FOR CONTINUOUSLY SUPPLYING
REFRIGERATION BELOW 4.2°K

Filed Jan. 31, 1967

Samuel C. Collins
INVENTOR.

BY *Bernie A. Lepper*

Attorney

United States Patent Office 3,415,077
Patented Dec. 10, 1968

3,415,077
METHOD AND APPARATUS FOR CONTINUOUSLY SUPPLYING REFRIGERATION BELOW 4.2° K.
Samuel C. Collins, Belmont, Mass., assignor, by mesne assignments, to 500 Incorporated, Cambridge, Mass., a corporation of Delaware
Filed Jan. 31, 1967, Ser. No. 612,859
23 Claims. (Cl. 62—467)

ABSTRACT OF THE DISCLOSURE

A cryogenic apparatus capable of continuously supplying liquid helium at a temperature below 4.2° K. by reducing the vapor pressure over liquid helium to the extent required to obtain the desired temperature. The subatmospheric vapor which is withdrawn is used to cool, in an adjuvant heat exchanger, a portion of the high-pressure helium which is to be liquefied, the remaining liquefied helium being supplied either from a reservoir of liquid helium at atmospheric pressure or, preferably, from a cryogenic refrigerator the cycle and apparatus of which are integrated with that of the adjuvant heat exchanger.

Background of the invention

Helium has a boiling point of 4.2° K. at atmospheric pressure. Liquid helium at this temperature has found a wide range of uses, including the cooling of various materials to determine their physical properties and the cooling of certain metals and intermetallic compounds to render them superconducting. Since helium has the lowest condensing point of any gas known, it is necessary to resort to systems which are capable of reducing the temperature of the liquid helium to obtain working temperatures of lower than 4.2° K. It has long been known that one way of accomplishing this is to reduce the vapor pressure over the liquid helium since liquid helium (at least in this respect) behaves essentially as do other liquids, i.e., it exhibits a decrease in temperature with a decrease in pressure. Thus by reducing the pressure in a liquid helium reservoir, it is possible to reduce its temperature. For example, reducing the pressure over the liquid to 12.4 mm. reduces the liquid helium temperature to 1.8° K.; while reducing the pressure to 0.0041 mm. reduces the temperature to 0.73° K., the last being about as low as can practicably be obtained with mechanical vacuum pumps in the system.

Liquid helium at about 2.2° K. passes through a second order transition point, and below this so-called lambda point it becomes superfluid, a now well-documented property. In its superfluid state the liquid flows as if it has little, if any, viscosity; and moreover, at about 1.8° K. the superfluid helium exhibits its maximum thermal conductivity, making it an excellent refrigerant, particularly for refrigerating any device which is intricate in design and has a large number of very small passageways and clearances through which the refrigerant must pass to achieve the required cooling.

Two basic types of systems have been available in prior art for providing liquid helium below 4.2° K. as a refrigerant. The first of these may be referred to as an apparatus suitable for a batch process. The liquid helium is introduced into a suitably insulated fluid-tight container having therein two liquid helium reservoirs joined by a short length of a thin walled, low thermal conductivity capillary. The load to be refrigerated is affixed to the exterior of one of the liquid helium reservoirs. After precooling with liquid nitrogen the liquid helium reservoirs are filled from an outside source, and then the container is evacuated. This, of course, necessitates the periodic filling of the reservoirs with liquid helium and it is not, therefore, possible continuously to cool a load at temperatures below 4.2° K. with such an apparatus. (See for example "Low Temperature Techniques," by A. C. Rose-Innes, D. Van Nostrand Company, Inc., New York, 1964.)

The second type of apparatus designed for furnishing refrigeration below 4.2° K. to a load may be considered as a form of continuous operation, but is highly inefficient in terms of the refrigeration required. This apparatus involves a separate cryogenic liquefier designed continuously to deliver liquid helium to a reservoir in which the load is positioned and from which the helium vapor is continuously pumped by means of a suitable vacuum pump. The subatmospheric-pressure helium gas is withdrawn directly into the vacuum pump and any refrigeration which might be available from this subatmospheric-pressure helium gas is lost.

Summary of the invention

In the cryogenic apparatus of this invention the cold subatmospheric-pressure helium gas which is withdrawn from the reservoir by the vacuum pump is used in a heat exchanger herein referred to as the adjuvant heat exchanger to deliver refrigeration to a stream of high-pressure helium gas. This high-pressure helium gas is liquefied by isenthalpic expansion and is supplemented by additional liquid helium supplied by a refrigerator or from a liquid helium source. In a preferred embodiment of the apparatus a cryogenic refrigerator, in which a first stream of high-pressure helium is cooled, is combined with the adjuvant heat exchanger designed to effect efficient indirect heat exchange between a second stream of high-pressure helium and the subatmospheric pressure helium resulting from the pumping of a vacuum on the liquid helium. The two high-pressure streams are united to form a single high-pressure stream which is directed through a plurality of Joule-Thomson heat exchangers and liquefied by expansion in Joule-Thomson expansion valves. The second high-pressure stream may be introduced into the adjuvant heat exchanger at several temperature levels, and in one embodiment a portion of the high-pressure stream in the adjuvant heat exchanger is withdrawn, expanded, and introduced into the low-pressure side of the heat exchange system of the cryogenic refrigerator. This makes it possible to obtain the optimum heat exchange in the adjuvant heat exchanger by achieving an imbalance in the mass rates of flow.

It is, therefore, a primary object of this invention to provide an integrated cryogenic apparatus which is capable of delivering refrigeration at temperatures below 4.2° K. It is another object of this invention to provide apparatus of the character described which is efficient, making optimum use of all of the refrigeration available in the system. It is another object of this invention to provide cryogenic apparatus of the character described which is capable of continuously producing superfluid helium. It is another object to provide such apparatus which is capable of delivering refrigeration over a predetermined range of temperatures below 4.2° K.

Another primary object of this invention is to provide an improved method for continuously supplying refrigeration below 4.2° K., the method achieving a much higher degree of efficiency than heretofore possible.

Other objects of the invention will in part be obvious and will in part be apparent hereafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Figure 1:
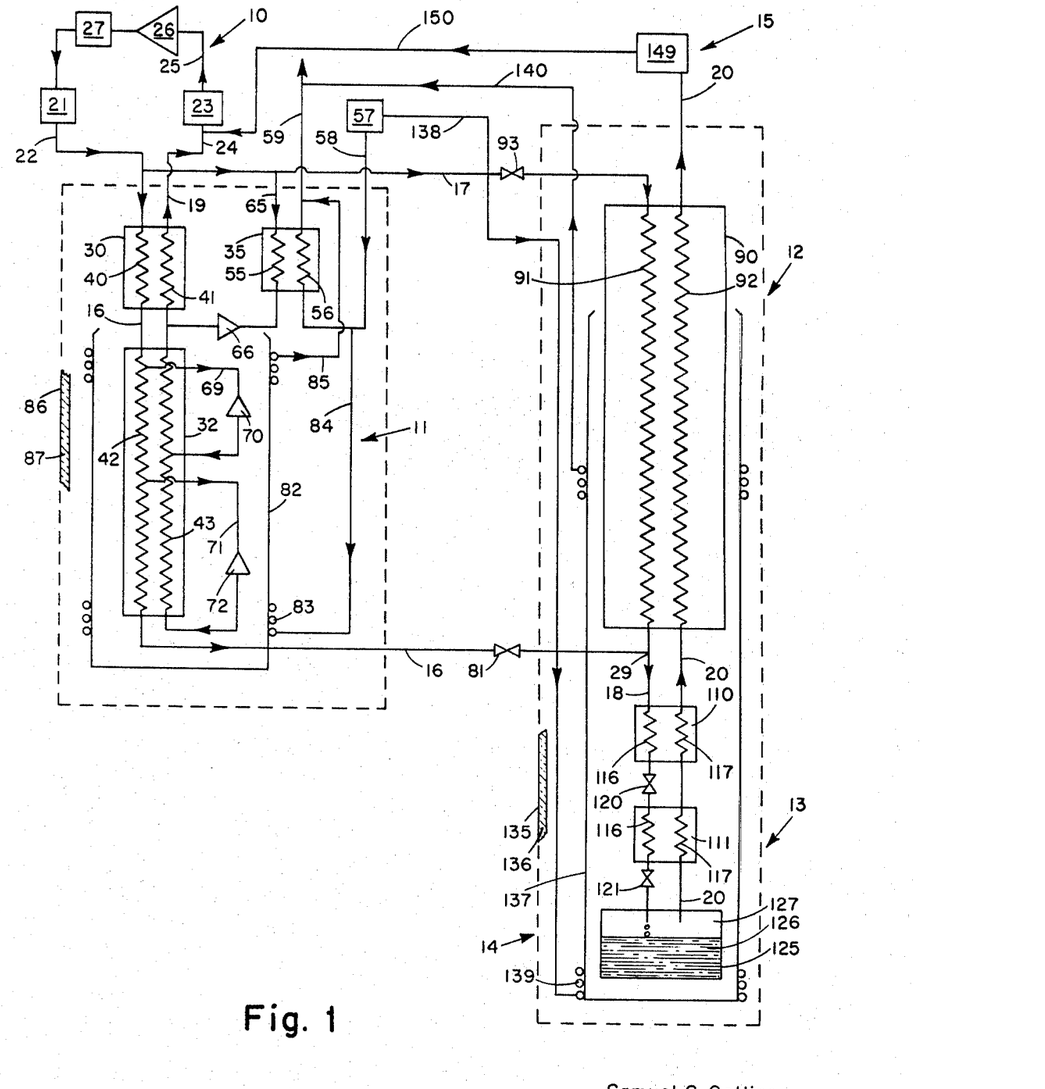
FIG. 1 is a diagrammatic representation of apparatus constructed in accordance with this invention in which high-pressure helium is supplied to the adjuvant heat exchanger at essentially room or ambient temperature.

FIG. 1 illustrates diagrammatically an apparatus constructed in accordance with this invention. In the apparatus of FIG. 1 the high-pressure gas is introduced into the adjuvant heat exchanger at atmospheric or ambient temperature. In general, the basic cryogenic apparatus of this invention may be considered to be formed of the following components: a helium source 10, a cryogenic refrigerator 11, the adjuvant heat exchanger 12, a Joule-Thomson expansion and liquefaction section 13, a liquid helium reservoir system 14, and a pumping means 15. Each of these components will be subsequently described in detail. Fluid flow within the apparatus may be seen to be accomplished in a first high-pressure fluid flow path 16 which is primarily contained within the refrigerator, a second high-pressure fluid flow path 17 which incorporates the high-pressure side of the adjuvant heat exchanger component 12, a third high-pressure fluid flow path 18 which is formed by the juncture of paths 16 and 17 and which incorporates the Joule-Thomson heat exchanger-expansion system; a first low-pressure fluid flow path 19 which incorporates the cryogenic refrigerator; and a second low-pressure fluid path 20 which incorporates the low-pressure side of the adjuvant heat exchanger.

It is, of course, necessary to provide high-pressure helium gas to the apparatus; and this is done by the helium source component 10 which in FIG. 1 is comprised of a high-pressure helium reservoir 21, having a high-pressure supply line 22; and a low pressure helium reservoir 23 adapted to receive, through line 24, low-pressure fluid from the refrigerator and the vacuum pump. The reservoirs are connected by a suitable fluid conduit 25 having located therein a compressor 26 and a suitable clean-up system 27. The high-pressure supply line 22 is in fluid communication with the first and second high-pressure fluid flow paths 16 and 17, and these paths converge at juncture point 29.

It is now possible to describe each of the components and to show how they are integrated by means of the various fluid flow paths.

*The cryogenic refrigerator*

It will be appreciated, of course, that a number of different types of cryogenic apparatus operating on suitable cycles may be employed, and that those refrigerators illustrated in FIGS. 1–5 are exemplary only. It is the purpose of the cryogenic refrigerator to deliver to the third high-pressure flow path 18 cold high-pressure helium. This cold high-pressure helium should not be above 30° K., and may have a pressure up to 30 atmospheres.

Generally, such a cryogenic refrigerator will be comprised of several heat exchangers and expansion engines, and the use of liquid nitrogen to precool the high-pressure gas will normally be a part of the cycle. The refrigerator of FIG. 1 has a first heat exchanger 30 and a second heat exchanger 32. Typically, these heat exchangers are constructed to provide a helically wound finned tubing within an annular housing for the high-pressure side and the volume around the finned tubing as the low-pressure side. In the drawings presented herewith the high-pressure and low-pressure sides are illustrated in a conventional manner, i.e., by zigzag lines. Thus heat exchanger 30 has a high-pressure side 40 and a low-pressure side 41; while heat exchanger 32 has a high-pressure side 42 and a low-pressure side 43. Any heat exchange means which can efficiently effect the indirect exchange of heat between a high-pressure gas stream and a low-pressure gas stream may, of course, be employed.

The refrigerator is also shown to have a precooling heat exchanger 35 designed to precool a portion of the high-pressure gas prior to its expansion and return through the low-pressure fluid flow path 19 of the refrigerator. Precooling is typically done with liquid nitrogen which is circulated in coils affixed for thermal contact to a centrally-located high-pressure channel containing a number of foraminous plates (e.g., of copper). The high-pressure gas is cooled by a contact with the foraminous plates which in turn are cooled indirectly by the liquid nitrogen or other coolant. A number of heat exchanger designs and constructions are known for efficiently effecting such precooling and may be used, the one described being exemplary only.

In the figures the high-pressure helium side of the precooling heat exchanger is represented by zigzag line 55 and the liquid nitrogen coils by zigzag line 56. Liquid nitrogen is supplied from a suitable source 57 through conduit 58 and discharged as gaseous nitrogen through discharge line 59. High-pressure helium is drawn off the high-pressure fluid flow path 17 by means of conduit 65 and after precooling in heat exchanger 35 and expanding in expansion engine 66 with further cooling, it is returned by way of low-pressure flow path 19 into the low-pressure side of heat exchanger 30 for effecting the initial cooling of the first high-pressure stream 16. In keeping with present cryogenic refrigerator design high-pressure initially-cooled helium gas is withdrawn from the high-pressure side 42 at two temperature levels in heat exchanger 32, expanded with further cooling and returned to the low-pressure side 43. Thus in the apparatus of FIG. 1, this is accomplisehd through line 69, in which expansion engine 70 is incorporated, at the higher temperature level (for example, at about 27° K.); and through line 71, in which the expansion engine 72 is incorporated, at the lower temperature level (for example, at about 17° K.).

The expansion engines 66, 70 and 72 may be any which are suitable for expanding initially-cooled high-pressure helium to cool it further and reduce its pressure. Thus, for example, the expansion engine described in U.S. Patent 2,607,322 or the expansion engine described in my copending application Ser. No. 593,852 may be used in a cryogenic refrigerator of this type. They must, however, be capable of effecting essentially adiabatic expansion of the gas.

Some control must be exercised over the flow of the fluid in high-pressure fluid flow path 16 so that the cold high-pressure helium reaches juncture point 29 at a desired pressure and temperature. This control is achieved by valve 81 which may combine the functions of flow rate control and expansion for further cooling.

In keeping with cryogenic refrigerator design practice, at least the colder part of the refrigerator will be enclosed in a radiation shielding 82 (represented by an enclosing line) which may be cooled by the liquid nitrogen withdrawn from supply 57, conducted to coils 83 by conduit 84 and returned thereto through return line 85. The entire refrigerator is enclosed in a suitable housing 86 (most of which is indicated by the dotted line) having insulation shown schematically at 87. Suitable insulating systems for cryogenic equipment are well known.

*The adjuvant heat exchange system*

The purpose of the adjuvant heat exchange system 12 is to utilize the refrigeration available in the subatmospheric-pressure, cold helium gas pumped out of the reservoir by the vacuum pump. The efficient use of such refrigeration is preferably accomplished in a unique heat exchanger to be described. This heat exchanger is designed to take into account the large difference in volume rates of flow between the high pressure gas and the subatmospheric pressure gas. FIG. 1 illustrates this heat exchanger 90 diagrammatically, having a high-pressure side 91 and a low-pressure side 92. A fluid flow control valve 93 is located in high-pressure flow path 17 which delivers the high-pressure helium to the heat exchanger.

Figure 7:
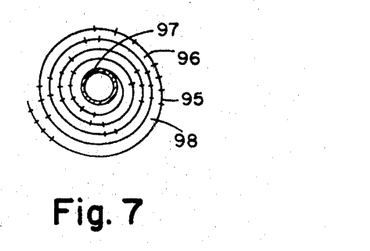
FIG. 7 is a top plan view of a spiral layer of finned tubing.
Figure 8:
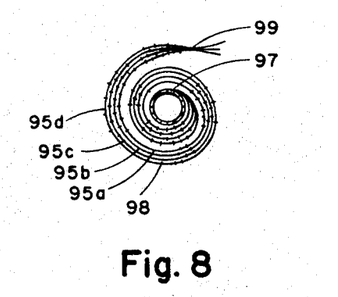
FIG. 8 is a top plan view of a multi-tubed spiral layer of finned tubing.

A heat exchanger is illustrated in detail in FIGS. 7–10. The high-pressure side 91 comprises a suitable high-pressure tubing 95, having fins 96, wound in spiral layers around a central mandrel 97. As each layer is completed to form the desired diameter, the tubing is bent to bring it to the level of the next spiral layer. Thus the tubing is alternately wound outwardly and inwardly. In the upper or warmer sections of the heat exchanger it is advantageous to use a plurality of tubing lengths, wound in adjacent relationship to form the spiral layer. This is illustrated in FIG. 8 wherein four finned tubings, 95a–d, are wound around the mandrel. Connections are made through a common header 99. In the heat exchanger of FIG. 8, the layers of spirally wound finned tubing are formed of a plurality of finned tubings wound in parallel, the number of the finned tubings thus wound in parallel decreasing from the warmer ot the colder end. As an alternative to this type of arrangement, or in addition to it, the finned tubing may be of decreasing diameter as it leads from the warmer to the colder end of the heat exchanger.

Figure 9:
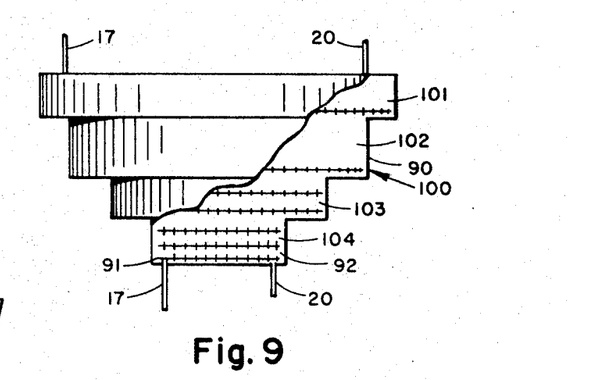
FIG. 9 is a side elevation, partly in cross section, of the adjuvant heat exchanger.
Figure 10:
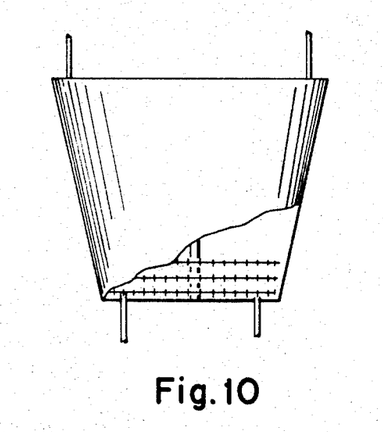
FIG. 10 is a side elevation, partly in cross section, of a modification of the adjuvant heat exchanger.

The embodiment of this heat exchanger illustrated in vertical cross section in FIG. 9 is seen to be in the form of a stepped housing configuration 100 which is divided into four sections 101, 102, 103, and 104, of decreasing diameter of each section with decreasing temperature. The finned tubing in section 101 comprises 4 tubings, wound as shown in FIG. 8, in section 102 three tubings, and in sections 103 and 104 a single tubing as shown in FIG. 7. The tubings in each section are joined to the adjacent section through a header such as shown in somewhat extended form in FIG. 8. In place of the stepped configuration FIG. 9, the heat exchanger may be frustoconical in shape as shown in FIG. 10.

*The Joule-Thomson heat exchanger—valve section and liquid reservoir*

The high-pressure gas stream in flow path 18 must be further cooled and expanded to be liquefied. This is preferably done in at least two steps, and may be done in more as shown in FIGS. 2–5. There are therefore supplied a number of Joule-Thomson heat exchangers 110 and 111 in FIG. 1, and Joule-Thomson valves 120 and 121. These heat exchangers 110 and 111 are of essentially the same construction as heat exchangers 30 and 32, the actual volumes of the high-pressure sides 116 and low-pressure sides 117 being adjusted to compensate for the decrease in gas volume with decrease in temperature. The Joule-Thomson expansion valves are of known construction and they may be characterized as being capable of effecting isenthalpic expansion of the gas subsequent to its being cooled in the so-called Joule-Thomson heat exchanger. Some liquefaction may be accomplished in heat exchanger 111 and the remainder at valve 121.

The liquid helium reservoir is typically a closed container 125 through the walls of which the conduits forming the high and low-pressure flow paths are passed and make a fluid-tight seal. Within the container is a layer of liquid helium 126 and above it a vapor space 127. If the load to be refrigerated is a large object, e.g., a superconducting magnet, the reservoir may take the form of a large insulated vessel in which the magnet is placed. The refrigerator may be of such a size as to supply all of the liquid helium required. As an alternative a quantity of liquid helium may be initially introduced from an external supply. In any case, once the magnet or other object has been brought down to the desired temperature, the load is represented by the heat leak into the system plus any heat generated by the object being cooled. It is therefore the function of the apparatus to maintain the desired liquid level within the vessel constant by reliquefying the vapor pumped off In FIG. 1, a separate housing 135, with suitable insulation, is supplied for the adjuvant heat exchanger, the Joule-Thomson heat exchange-valve system and the reservoir system. A radiation shield 137 surrounds at least the cold end of the adjuvant heat exchanger and the remaining components, and it is cooled by liquid nitrogen withdrawn from reservoir 57 by means of conduit 138 for circulation in coils 139 and then for return as gas through conduit 140 into discharge line 59. It is, of course, within the scope of this invention to enclose the entire apparatus in a single housing, insulation and radiation shield, thus combining those separate housing, insulation and shielding components shown in FIG. 1.

The vapor presure in volume 127 of the reservoir is reduced to that level required to give the desired temperature. A vacuum pump 149, which may be a mechanical pump or ejector, is used for this purpose, being in direct fluid communication with the reservoir through the low-pressure side of heat exchanger 90. Such a vacuum pumping means will normally have two or more stages. In any event, the subatmospheric-pressure helium is raised to essentially atmospheric pressure before being returned to the system through line 150 into line 24 to be mixed with the low-pressure gas which leaves the refrigerator also at essentially atmospheric pressure.

Figure 2:
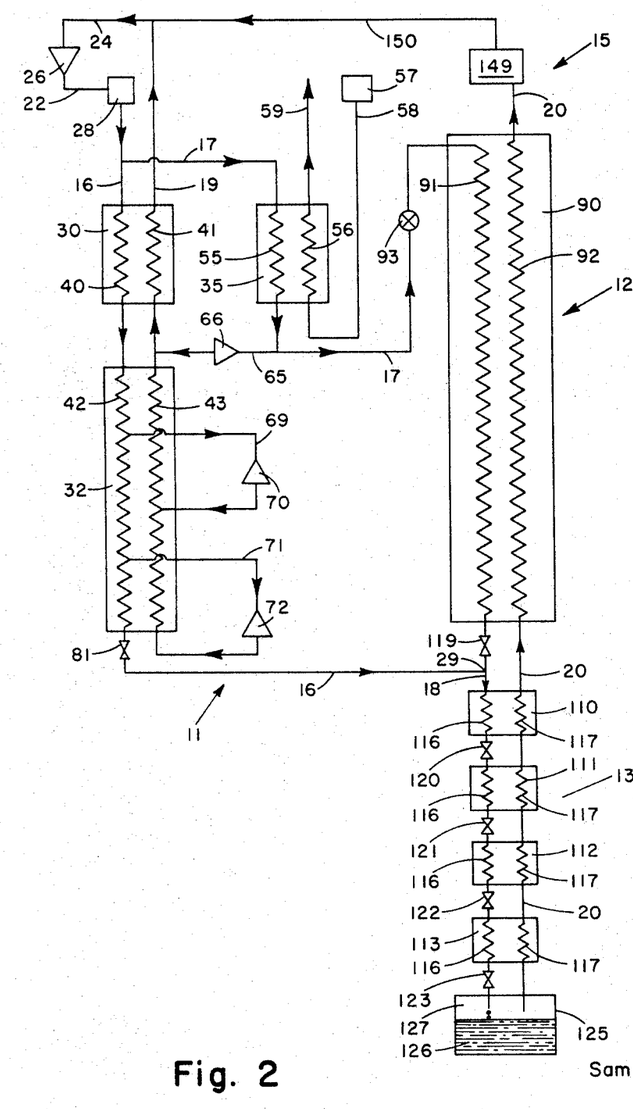
FIG. 2 is a diagrammatic representation of the apparatus of this invention in which the high-pressure helium gas is delivered to the adjuvant heat exchanger at a temperature below ambient temperature.

In the apparatus of FIG. 2, as in the case of that in FIG. 1 wherein like reference numerals refer to like components, the high-pressure fluid is introduced into the adjuvant heat exchanger at one temperature level. However, in FIG. 2 it is below ambient temperature. The liquid nitrogen precooling heat exchanger is used to precool the second high-pressure fluid stream in flow path 17. Thus the high-pressure side 55 of this heat exchanger is incorporated in the second high-pressure fluid flow path. A portion of the precooled high-pressure helium is then returned by line 65 and expansion engine 66 into the low-pressure side of the refrigerator as in the apparatus of FIG. 1. In the helium source component, the reservoirs have been omitted; and the connections are made directly through compressor 26 and aftercooler 28.

The apparatus of FIG. 2 has an additional valve 119 designed to adjust both the flow rate and temperature of the second high-pressure gas stream just prior to its confluence with the first stream at juncture point 29. This apparatus also has two additional Joule-Thomson heat exchangers 112 and 113 and two additional Joule-Thomson valves 122 and 123.

It will be appreciated that the apparatus of FIGS. 2–5 will be enclosed in suitable insulated housing or housings with the necessary thermal protection against heat leaks from the atmosphere as shown in FIG. 1. These components have not, however, been included in FIGS. 2–5 to simplify the drawings.

Figure 3:
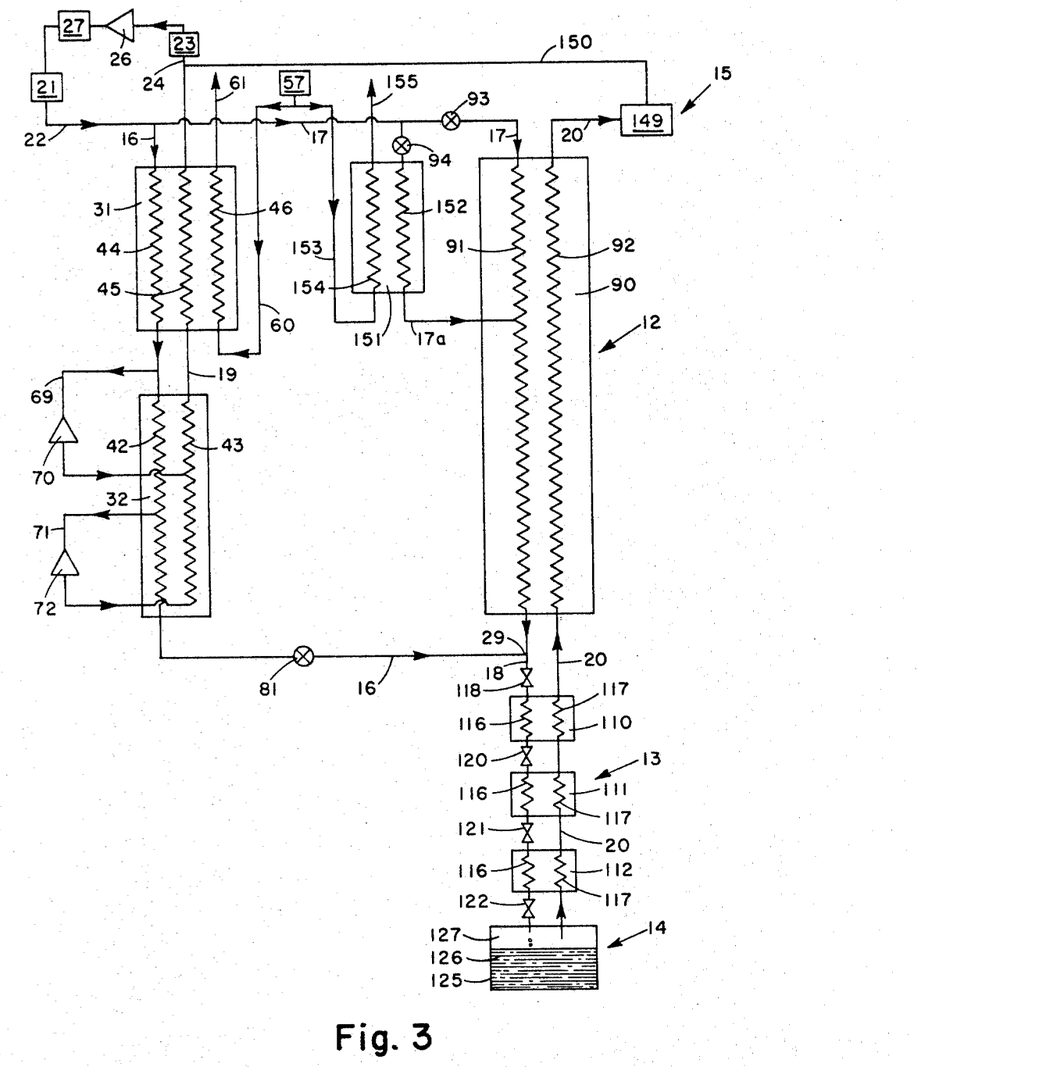
FIG. 3 is a diagrammatic representation of the apparatus in which the high-pressure helium gas is delivered to the adjuvant heat exchanger at two temperature levels.

In the apparatus of FIG. 3 the high-pressure helium is introduced into the adjuvant heat exchanger 90 at two temperature levels, namely at room temperature and at a lower temperature, e.g., that approaching liquid nitrogen (about 80° K.). This permits a somewhat more efficient use of the refrigeration supplied by the subatmospheric-pressure helium in heat exchanger 90. In the apparatus of FIG. 3, liquid nitrogen is used directly for precooling in the first heat exchanger of the refrigerator and the expansion engine 66 (FIGS. 1 and 2) is eliminated.

In FIG. 3 like reference numerals refer to like components in the drawings in the other figures. The first heat exchanger 31 of the refrigerator has a high-pressure side 44, low-pressure side 45 and a channel 46 for the liquid nitrogen, the latter typically being coils in thermal contact with the coils serving as the high-pressure side of the heat exchanger. The liquid nitrogen is supplied via conduit 60 and discharged through line 61 as a gas.

The second high-pressure fluid flow path 17 splits off into a branch 17a which incorporates the high-pressure side 152 of precooling heat exchanger 151. Valves 93 and 94 control the ratio of the amounts of high-pressure gas which enter heat exchanger 90 at room temperature and at about 80° K. Liquid nitrogen is supplied to the precooler by feed line 153 and is circulated through coils 154 and discharged through discharge line 155.

Finally, the apparatus of FIG. 3 has an additional fluid control valve 118 to regulate the fluid pressure in the third high-pressure fluid flow path 18.

Figure 4:
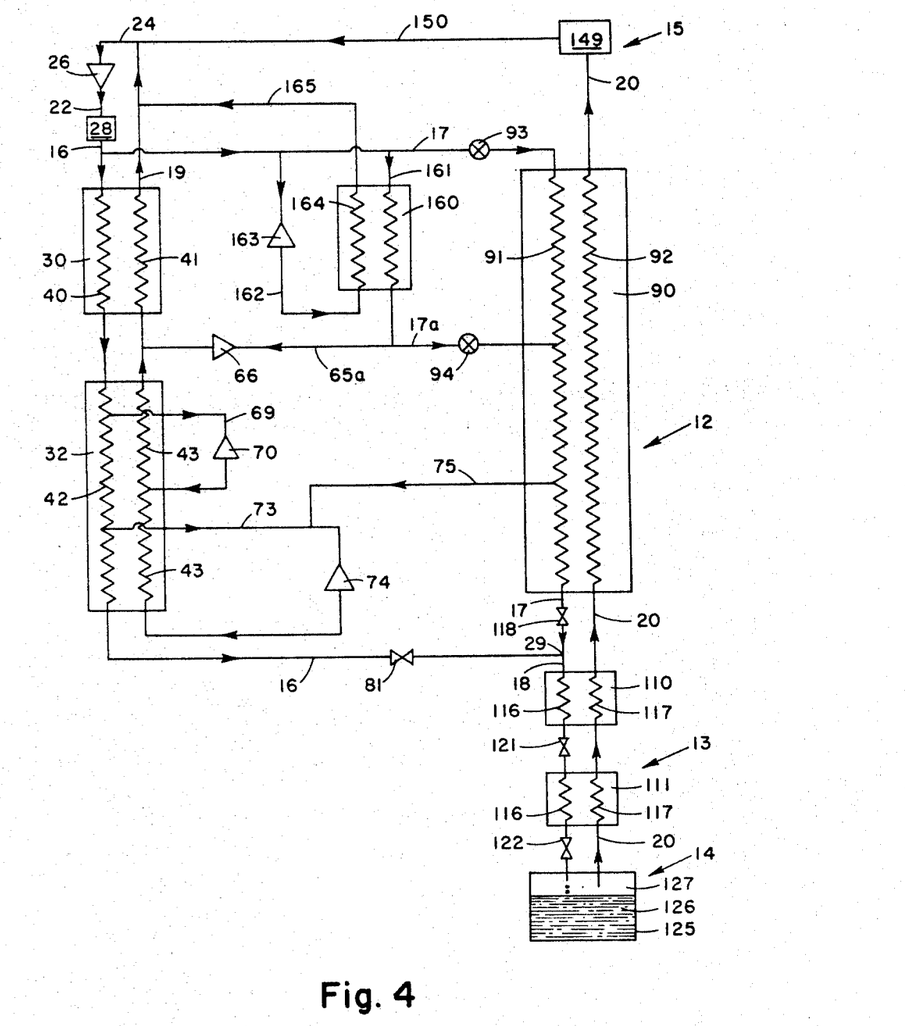
FIGS. 4 and 5 are diagrammatic representations of the apparatus in which the high pressure gas is delivered to the adjuvant heat exchanger at two temperature levels and a portion of the cold high-pressure fluid is withdrawn from the adjuvant heat exchanger to be expanded and used in the cryogenic refrigerator.

The apparatus of FIG. 4 differs from that of FIG. 3 in that a portion of the high-pressure cold gas is withdrawn from the adjuvant heat exchanger and is mixed with high-pressure gas at approximately the same temperature (e.g., 16° K.) for expansion and further cooling and return to the low-pressure side of the refrigerator. This is accomplished by withdrawing gas through conduit 75 and 73 and expanding the blended stream in expansion engine 74. The resulting cold low-pressure gas is returned to the coldest end of heat exchanger 32 through the low-pressure side 43 for indirect heat exchange with high-pressure gas in the high-pressure side 42. This arrangement also illustrates an alternative to the use of liquid nitrogen, or other cryogenic coolant, for precooling a portion of the high-pressure gas streams. This is accomplished by using a heat exchanger 160 (similar in construction to heat exchanger 30) having a high-pressure side 161 which in effect is a branch high-pressure line leading from high-pressure flow path 17 to 17a. Cooling is supplied by withdrawing a portion of the second high-pressure gas stream through line 162, expanding it adiabatically in expansion engine 163 to essentially atmospheric pressure, conducting it through the low-pressure side 164 of heat exchanger 160 and returning it to low-pressure line 24 through discharge line 165. As will be seen, the precooled high-pressure gas from heat exchanger 160 is divided, a portion entering the high-pressure side of the adjuvant heat exchanger and the remainder, via conduit 65a and expansion engine 66, the low-pressure side 41 of heat exchanger 30. It is also, of course, within the scope of this invention to use this manner of precooling high-pressure gas in the apparatus of FIGS. 1–3 and 5.

The withdrawal of a portion of the cold high-pressure fluid from the high-pressure side of the adjuvant heat exchanger is desirable because in the range between about 5 and 20° K., the specific heat at constant pressure, $C_p$, of high-pressure helium is much greater than the $C_p$ of low-pressure helium. Optimization of heat transfer requires that the product mass rate of flow $xC_p$ be essentially the same in the two streams of gas. Therefore, by withdrawing a portion of the high-pressure gas at a temperature level between about 16–20° K., it is possible to approach this desired balance.

Figure 5:
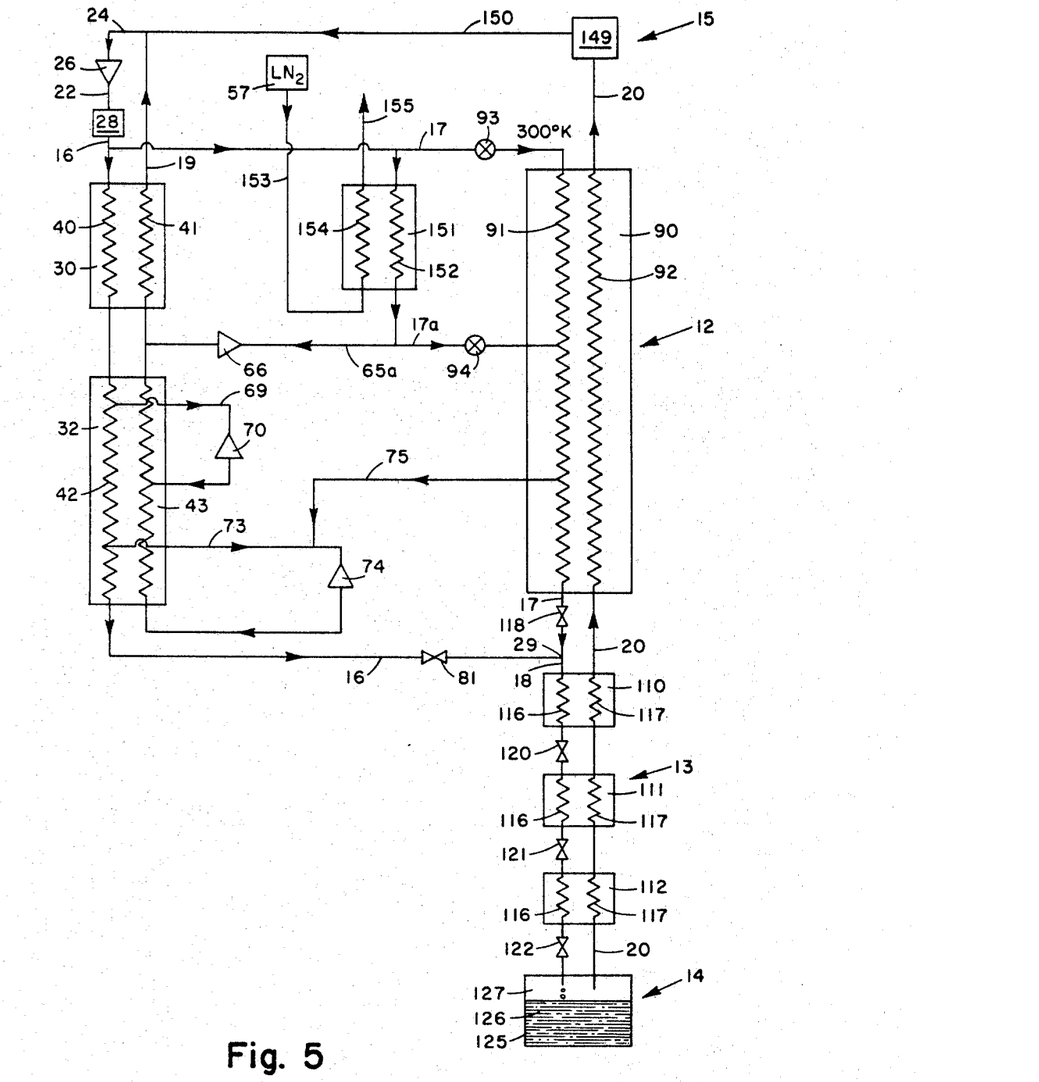

In the modification of FIG. 5, provision is also made to withdraw a portion of the high-pressure gas from heat exchanger 90 as in FIG. 4. This modification, however, incorporates the heat exchange system of FIG. 1 in the refrigerator and includes a third Joule-Thomson heat exchanger 112 and expansion valve 122.

Figure 6:
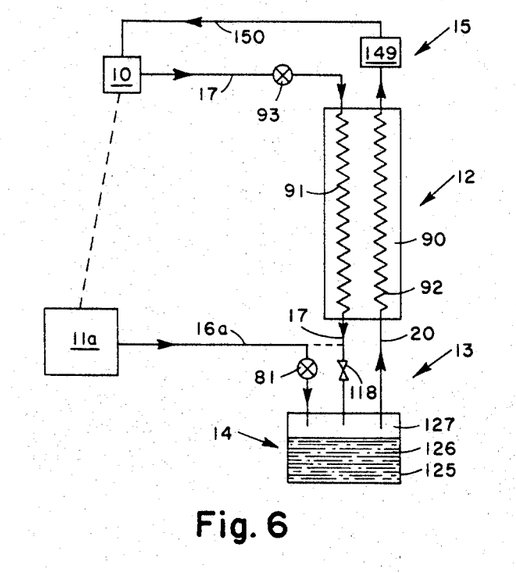
FIG. 6 is a diagrammatic representation of the apparatus in which there is no connection between the two high-pressure helium streams prior to their liquefaction.

Although it is preferred to use the apparatus of FIGS. 1–5, and particularly that of FIGS. 4 and 5, for attaining the most efficient refrigeration, it is possible to use the apparatus illustrated diagrammatically in FIG. 6, wherein like numerals refer to like elements in FIGS. 1–5. In this modification there is no direct blending of the two cold-high-pressure streams flowing in flow paths 16 and 17. Rather, the major portion of the liquid helium is furnished directly to reservoir 125 from an external source 11a which may be a supply of liquid helium or a liquefier such as described in U.S. Patents 2,458,894 and 3,250,079. The dotted lines are used to indicate the alternative arrangement of the complete integration of the refrigerator and the adjuvant heat exchanger as described in FIGS. 1–5.

In the modification of FIG. 6 it will be seen that although only a portion of the liquefied helium gas in reservoir 125 comes into the system as high-pressure helium through adjuvant heat exchanger 90 for liquefaction in value 118, all of the subatmospheric-pressure cold gas leaving reservoir 125 at a temperature below 4.2° K. returns through the low-pressure side of adjuvant heat exchanger 90. By the proper adjustment of mass rates of flow of the high-pressure and low-pressure streams in the adjuvant heat exchanger it is possible to cool the high-pressure gas sufficiently before it reaches valve 118 to make it possible to liquefy it by isenthalpic expansion in valve 118.

To illustrate the operation of the apparatus of this invention, typical temperature levels at different points in the apparatus of FIG. 5 may be given. It will, of course, be understood that the figures given are illustrative only and that a relatively wide range of pressures, temperatures and flow rates may be employed. The varying of these operational parameters are well within the skill of one knowledgeable in the cryogenic art. It will be assumed that it is desired to obtain a temperature of 1.85° K. in the liquid helium reservoir and that liquid nitrogen is used to precool the high-pressure stream in heat exchanger 151.

The high-pressure helium enters the first and second high-pressure fluid flow paths 16 and 17 at about 300° K. The temperature levels of the first high-pressure gas stream (i.e., the one passing through the refrigerator) are in this example, 81° K. at the point where it enters heat exchanger 32, 37° K. at the point where a portion is withdrawn through line 69 and 20° K. at the point where the low-pressure gas is returned to low-pressure side 43; 16° K. where additional high-pressure gas is withdrawn through line 73 and 8° K. as it leaves heat exchanger 32. It, therefore, reaches juncture point 29 at 8° K. The temperature levels of the second high-pressure gas stream through adjuvant heat exchanger 90 are 300° K. at the warm end, 79° K. at the point where the precooled portion of the gas stream is fed into high-pressure side 91; 16° K. at the level where a portion is withdrawn through line 75 and 8° K. at the juncture point 29. Further cooling of the blended high-pressure streams in flow path 18 takes place in the succeeding Joule-Thomson heat exchangers. Substantially all of the liquefaction is achieved in the last of the Joule-Thomson heat exchangers. By pumping the pressure in the reservoir down to 14.2 mm. Hg the temperature of the liquid drops to 1.85° K.

It will be apparent from the preceding description that there is provided an integrated cryogenic apparatus which is capable of continuously furnishing refrigeration below 4.2° K. There is also provided a unique cryogenic cycle which achieves a high efficiency, relatively speaking, in its use of all available refrigeration.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An apparatus for continuously providing liquid helium at a temperature below 4.2° K., comprising, in combination:
   (a) a source of liquid helium;
   (b) a source of high-pressure helium gas;
   (c) a fluid-tight reservoir adapted to contain liquid helium at a temperature below 4.2° K. and at a subatmospheric pressure;
   (d) an adjuvant heat exchanger having a high-pressure side and a low-pressure side being adapted to effect indirect heat exchange between a stream of said high-pressure helium and subatmospheric-pressure helium gas withdrawn from said reservoir;
   (e) fluid communication means joining said source of liquid helium with said reservoir;
   (f) a high-pressure helium flow path providing fluid communication between said source of high-pressure helium gas and said reservoir, incorporating the high-pressure side of said adjuvant heat exchanger and having liquefaction means adapted to liquefy cold, high-pressure helium gas prior to its delivery into said reservoir;
   (g) vacuum pumping means; and
   (h) a low-pressure helium flow path providing fluid communication between said reservoir and said vacuum pumping means whereby said vacuum pumping means maintains a subatmospheric pressure in said reservoir, said low-pressure helium flow path serving as the low-pressure side of said adjuvant heat exchanger.

2. An apparatus in accordance with claim 1 wherein said source of liquid helium is a cryogenic liquefier.

3. An apparatus in accordance with claim 1 wherein said adjuvant heat exchanger comprises in combination:
   (a) a fluid-tight housing, the cross section of which decreases from the warmer to the colder end; and
   (b) a plurality of layers of spirally wound, finned, high-pressure tubing, each of said layers having a diameter essentially equivalent to the inside diameter of said housing at its position within said housing, the tubing forming a continuous high-pressure fluid path through said heat exchanger, the low-pressure fluid path being the volume defined around said tubing.

4. An apparatus in accordance with claim 3 wherein said layers of spirally wound finned tubing are comprised of a plurality of finned tubings spirally wound in parallel, said tubings being periodically joined for fluid communication and decreasing in number with decreasing temperature of the fluid within said heat exchanger.

5. An apparatus in accordance with claim 1 wherein said source of liquid helium is a cryogenic liquefier having Joule-Thomson heat exchanger means and Joule-Thomson expansion-liquefaction means which serve also as said liquefaction means in said high-pressure helium flow path.

6. An apparatus for continuously providing liquid helium at a temperature below 4.2° K., comprising, in combination:
   (a) a source of high-pressure pure gaseous helium;
   (b) cryogenic refrigerator means, including heat exchange means with high-pressure and low-pressure sides in indirect heat exchange relationship and fluid expansion means, said refrigerator means being adapted to deliver gas at an elevated pressure up to about 30 atmospheres and at a temperature below 30° K.;
   (c) a reservoir for liquefied helium;
   (d) an adjuvant heat exchanger having a high-pressure side and a low-pressure side being adapted to effect indirect heat exchange between a stream of said high-pressure helium and subatmospheric-pressure helium gas withdrawn from said reservoir;
   (e) a first high-pressure helium flow path in fluid communication with said source of high-pressure helium and incorporating the high-pressure side of said heat exchange means of said cryogenic refrigerator means;
   (f) a second high-pressure helium flow path in fluid communication with said source of high-pressure helium gas and incorporating the high-pressure side of said adjuvant heat exchanger and having its cold end in fluid communication with the cold end of said first high-pressure helium flow path thereby to combine to form
   (g) a third high-pressure fluid flow path in fluid communication with said liquefied helium reservoir;
   (h) a plurality of Joule-Thomson heat exchange means capable of effecting indirect heat exchange between two fluid streams of different pressures, the higher pressure side of said Joule-Thomson heat exchange means being a portion of said third fluid flow path;
   (i) a plurality of Joule-Thomson expansion valves associated with said higher pressure side of said Joule-Thomson heat exchange means and adapted to expand and further cool the cold helium delivered from each of said Joule-Thomson heat exchange means, the last of said Joule-Thomson valves being in direct fluid communication with said reservoir;
   (j) vacuum pumping means; and
   (k) a low-pressure helium flow path providing fluid communication between said reservoir and said vacuum pumping means whereby said vacuum pumping means maintains a subatmospheric pressure in said reservoir, said low-pressure helium flow path serving as the lower pressure side of said Joule-Thomson heat exchanger means and the low-pressure side of said adjuvant heat exchanger.

7. An apparatus in accordance with claim 6 further characterized by having fluid flow rate controlling means incorporated in said first and said second high-pressure helium flow paths.

8. An apparatus in accordance with claim 6 further characterized by having precooling means adapted to cool at least a portion of said high-pressure helium.

9. An apparatus in accordance with claim 8 wherein said precooling means includes means to effect indirect heat exchange between a stream of a fluid coolant and said high-pressure helium.

10. An apparatus in accordance with claim 8 wherein said precooling means are employed to cool said high-pressure helium in said first high-pressure helium flow path.

11. An apparatus in accordance with claim 10 further characterized by including means to expand and further cool the precooled helium and to return the resulting low-pressure helium to said low-pressure side of said heat exchange means of said refrigerator means.

12. An apparatus in accordance with claim 8 wherein said precooling means are arranged to cool at least a portion of the high-pressure helium introduced into said second high-pressure helium flow path.

13. An apparatus in accordance with claim 12 wherein said precooling means are arranged to cool a portion of the high-pressure helium introduced into said second high-pressure helium flow path, the remainder of said helium entering said second high-pressure flow path at essentially ambient temperature.

14. An apparatus in accordance with claim 6 wherein said heat exchange means of said cryogenic refrigerator means has a plurality of fluid conduits each of which is adapted to withdraw a portion of high-pressure helium gas from said high-pressure side at successively lower temperature level, conduct it through said expansion means and return it as colder low-pressure gas to said low-pressure side; the one of said fluid conduits at the lowest temperature level being also in fluid communication with said high-pressure side of said adjuvant heat exchanger at a temperature level essentially equivalent to said lowest temperature level.

15. An apparatus in accordance with claim 6 wherein said adjuvant heat exchanger comprises in combination:
  (a) a fluid-tight housing, the cross section of which decreases from the warmer to the colder end; and
  (b) a plurality of layers of spirally wound, finned, high-pressure tubing, each of said layers having a diameter essentially equivalent to the inside diameter of said housing at its position within said housing, the tubing forming a continuous high-pressure fluid path through said heat exchanger, the low-pressure fluid path being the volume defined around said housing.

16. An apparatus in accordance with claim 15 wherein said layers of spirally wound finned tubing are comprised of a plurality of finned tubings spirally wound in parallel, said tubings being periodically joined for fluid communication and decreasing in number with decreasing temperature of the fluid within said heat exchanger.

17. An apparatus in accordance with claim 15 wherein the inside diameter of said finned tubing is less at the colder end than at the warmer end of said heat exchanger.

18. In a method for continuously providing refrigeration at temperatures below 4.2° K. in which the vapor pressure above a body of liquefied helium is maintained at subatmospheric pressure, the step of employing all of the cold vapor withdrawn from the volume above said body of liquefied helium to cool and liquefy a quantity of high-pressure helium gas which becomes a part of said body of liquefied helium.

19. A method for continuously providing refrigeration at temperatures below 4.2° K., comprising the steps of:
  (a) cooling a first stream of high-pressure helium gas to below 30° K. by indirect heat exchange with helium withdrawn from said first stream and expanded to a lower pressure;
  (b) cooling a second stream of high-pressure helium gas to below 30° K. by indirect heat exchange with a stream of subatmospheric-pressure helium;
  (c) blending said first and second streams at essentially the same temperature to form a third stream of high-pressure gas;
  (d) cooling and expanding said third stream by indirect heat exchange with said stream of subatmospheric-pressure helium thereby to liquefy said third stream;
  (e) delivering the resulting liquefied gas into a reservoir;
  (f) reducing the pressure of the vapor over said liquefied gas in said reservoir; and
  (g) employing the resulting subatmospheric-pressure helium to effect said cooling of said second and third streams of high-pressure helium gas.

20. A method in accordance with claim 19 including the step of precooling a portion of said first stream of high-pressure helium gas by indirect heat exchange with a cryogenic coolant.

21. A method in accordance with claim 19 including the step of precooling at least a portion of said second stream of high-pressure helium gas, prior to its cooling by said stream of subatmospheric-pressure helium, by indirect heat exchange with a cryogenic coolant.

22. A method in accordance with claim 19 wherein a first portion of said second stream is brought into heat exchange relationship with said subatmospheric-pressure stream at ambient temperature and a second portion is brought into heat exchange relationship with said subatmospheric-pressure stream at about 80° K.

23. A method in accordance with claim 19 wherein a portion of said second stream of high-pressure helium is withdrawn when it reaches between 14 and 20° K. through heat exchange with said subatmospheric-pressure helium and is added to a portion of said first stream of high-pressure helium gas at approximately the same temperature level withdrawn to be expanded to said lower-pressure in step (a).

References Cited

UNITED STATES PATENTS

| 3,021,683 | 2/1962  | McInroy   | 62—514 X |
| 3,125,863 | 3/1964  | Hood      | 62—77 X  |
| 3,162,716 | 12/1964 | Silver    | 62—514   |
| 3,195,322 | 7/1965  | London    | 62—514 X |
| 3,269,137 | 8/1966  | Hood      | 62—403 X |
| 3,313,117 | 4/1967  | Hood et al. | 62—467 X |

LLOYD L. KING, Primary Examiner.

U.S. Cl. X.R.

62—514